(12) United States Patent
Beck

(10) Patent No.: US 10,196,840 B2
(45) Date of Patent: Feb. 5, 2019

(54) ACTUATION DEVICE

(71) Applicant: ILLINOIS TOOL WORKS INC., Glenview, IL (US)

(72) Inventor: Christian Beck, Roettingen (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 1002 days.

(21) Appl. No.: 14/382,008

(22) PCT Filed: Feb. 28, 2013

(86) PCT No.: PCT/US2013/028133
§ 371 (c)(1),
(2) Date: Aug. 29, 2014

(87) PCT Pub. No.: WO2013/130691
PCT Pub. Date: Sep. 6, 2013

(65) Prior Publication Data
US 2015/0008685 A1 Jan. 8, 2015

(30) Foreign Application Priority Data
Mar. 2, 2012 (DE) .................. 10 2012 004 071

(51) Int. Cl.
*E05B 83/34* (2014.01)
*B60K 15/05* (2006.01)
(Continued)

(52) U.S. Cl.
CPC .............. *E05B 83/34* (2013.01); *B60K 15/05* (2013.01); *E05B 81/06* (2013.01); *E05B 81/66* (2013.01);
(Continued)

(58) Field of Classification Search
CPC .......... E05B 83/34; E05B 81/06; E05B 81/14; E05B 81/66; Y10T 292/096;
(Continued)

(56) References Cited

U.S. PATENT DOCUMENTS 5,199,288 A * 4/1993 Merilainen ......... E05B 47/0012
292/144
7,377,559 B2 * 5/2008 Gramss ................... E05B 83/34
220/211
(Continued)

FOREIGN PATENT DOCUMENTS

CN 101426662 A 5/2009
CN 102308053 A 1/2012
(Continued)

OTHER PUBLICATIONS

ISR and WO for PCT/US2013/028133 dated Aug. 21, 2013.

*Primary Examiner* — Alyson M Merlino
(74) *Attorney, Agent, or Firm* — Pilloff & Passino LLP; Martin J. Cosenza

(57) ABSTRACT

The invention relates to an actuation device for a flap mounted moveably on a component between a closed position and an opened position, in particular for a flap mounted moveably on a housing of an automobile, comprising: a first actuation part and a second actuation part, wherein the first actuation part is to be fastened on the flap and is moved together with the flap when the flap is moved between the closed position and the opened position, and wherein the second actuation part is to be fastened on the component, locking means with a locking reception provided on the first or second actuation part and a locking element provided on the other of first or second actuation part, wherein the locking element engages in the locking reception upon a movement of the first actuation part with the flap from its opened position into its closed position, whereby the locking (Continued)

element holds the first actuation part against a spring pretension in a locking position on the second actuation part, and a remote unlocking device, wherein the remote unlocking device comprises drive means, which can be actuated from a place distant from the actuation parts such that the locking element is retracted from the locking reception, whereby the first actuation part, driven by the spring pretension, disengages from the second actuation part and moves together with the flap at least partially into its opened position.

30 Claims, 8 Drawing Sheets

(51) Int. Cl.
 *E05B 81/66* (2014.01)
 *E05B 81/06* (2014.01)
 *E05B 47/00* (2006.01)

(52) U.S. Cl.
 CPC ............ *B60K 2015/0576* (2013.01); *B60K 2015/0584* (2013.01); *E05B 47/0012* (2013.01); *E05B 2047/0025* (2013.01); *Y10T 292/57* (2015.04)

(58) Field of Classification Search
 CPC ......... Y10T 292/0969; Y10T 292/0997; Y10T 292/0999; Y10T 292/1001; Y10T 292/1021; Y10T 292/1022; Y10T 292/1028; Y10T 292/1029; Y10T 292/54; Y10T 292/546; Y10T 292/558; B60K 15/05; B60K 15/0561; B60K 15/0576; B60K 15/0584; B60K 2015/0576; B60K 2015/0584
 USPC ................................................ 296/97.22, 155
 See application file for complete search history.

(56) References Cited

U.S. PATENT DOCUMENTS

| | | | |
|---|---|---|---|
| 8,353,553 B2 | 1/2013 | Beck | |
| 8,398,127 B2 | 3/2013 | Persiani et al. | |
| 9,616,745 B2 * | 4/2017 | Beck | ........................ E05B 83/34 |
| 9,631,403 B2 * | 4/2017 | Beck | ........................ E05B 83/34 |
| 2009/0139991 A1 | 6/2009 | Nakaya | |
| 2011/0241360 A1 * | 10/2011 | Kitamura | ................ E05B 83/34 292/201 |
| 2014/0030015 A1 | 1/2014 | Beck | |
| 2014/0084599 A1 | 3/2014 | Beck | |

FOREIGN PATENT DOCUMENTS

| | | | | |
|---|---|---|---|---|
| DE | 10050558 A1 | 4/2002 | | |
| DE | 102008057933 A1 | 7/2010 | | |
| DE | 202010012379 U1 | 12/2011 | | |
| DE | 102011101838 A1 | 11/2012 | | |
| EP | 1350655 A1 * | 10/2003 | ............. | E05B 83/34 |
| GB | 2149447 A | 6/1985 | | |
| WO | 2008/059543 A1 | 5/2008 | | |

* cited by examiner

ACTUATION DEVICE

BACKGROUND

The invention relates to an actuation device for a flap mounted moveably on a component between a closed position and an opened position, in particular for a flap mounted moveably on a housing of an automobile.

It is known for filler-neck flaps, for example, of automobiles to be actuated by means of so-called push-push devices. A corresponding actuation device is described in DE 10 2008 057 933 A1. The actuation device is fastened on a filler-neck housing, wherein said actuation device has an actuation end which projects out of the housing in the installed state. The known actuation device has an axially movably mounted tappet which has on its outer circumference a control curve for realizing the push-push kinematic. During operation, the filler-neck flap interacts with the actuation end, which projects out of the housing, of the actuation device. In particular, in the closed state, the filler-neck flap rests with its inner side on the actuation end. Owing to the push-push kinematic, the actuation device can, by virtue of the filler-neck flap being pressed in the direction of the automobile body, be moved into an unlocking position in which the actuation end protrudes further out of the filler-neck housing and the filler-neck flap rises slightly from the body surface. The filler-neck flap can then be manually gripped and fully pivoted open. During a subsequent closure of the flap, and when a force is exerted here on the actuation end of the actuation device, said actuation device is placed into a locking position again.

In order that the filler-neck flap cannot unintentionally pivot open when in the locking position, it is preloaded into the closed position by a spring. Forces act on the filler-neck flap during operation of the vehicle but also as early as during the assembly process. Examples here are situations in which the vehicle is assembled in a pivoted or overhead position, in which the force of gravity acts on the filler-neck flap in the opening direction of the flap. Another example is car washes, where an exertion of force in the opening direction of the flap may likewise arise in particular during the drying process. An unintentional opening of the filler-neck flap must be reliably prevented in these situations. The spring which preloads the filler-neck flap into the closed position must therefore exert a relatively high spring force. Said spring force must be overcome by a user during the opening of the flap. This can reduce convenience. Furthermore, with the relatively high spring forces, undesired noise generation can arise during the actuation.

In the applicant's prior German patent application, which does not constitute a prior publication, with the file reference 10 2011 101 838.0, a first actuation part of an actuation device is fastened on the flap, such that said first actuation part is moved together with the flap when the flap is moved, and a second actuation part is fastened on the component, which is for example fixedly arranged in or on an automobile. Said separation of the actuation parts eliminates the need for a spring force for holding the flap in the closed position. Instead, the flap is arrested by means of the first actuation part provided thereon on the second actuation part and thus on the component provided with the flap. The actuation device utilizes a push-push kinematic, such that the flap can be released from the arrested position in a manner known per se by virtue of the flap being pushed inward manually, such that said flap subsequently moves into an at least partially pivoted-open position.

Instead of a manual opening of the flap by pushing in by means of a push-push kinematic, it is sometimes desirable for a filler-neck flap of an automobile to be unlocked by remote control, for example. Known remote-controllable actuation devices for filler-neck flaps of automobiles however involve a high level of outlay in terms of design and construction.

Taking the discussed prior art as a starting point, it is the object of the invention to provide an actuation device of the type specified in the introduction, by means of which a flap mounted moveably on a component can be unlocked remotely, wherein the actuation device has a simple and compact construction.

SUMMARY

The invention achieves the object by means of an actuation device for a flap mounted moveably on a component between a closed position and an opened position, in particular for a flap mounted moveably on a housing of an automobile, comprising: a first actuation part and a second actuation part, wherein the first actuation part is to be fastened on the flap and is moved together with the flap when the flap is moved between the closed position and the opened position, and wherein the second actuation part is to be fastened on the component, locking means with a locking reception provided on the first or second actuation part and a locking element provided on the other of first or second actuation part, wherein the locking element engages in the locking reception upon a movement of the first actuation part with the flap from its opened position into its closed position, whereby the locking element holds the first actuation part against a spring pretension in a locking position on the second actuation part, and a remote unlocking device, wherein the remote unlocking device comprises drive means, which can be actuated from a place distant from the actuation parts such that the locking element is retracted from the locking reception, whereby the first actuation part, driven by the spring pretension, disengages from the second actuation part and moves together with the flap at least partially into its opened position.

The flap may be a flap in or on an automobile. The flap may be for example a filler-neck flap or charging flap of an automobile, said flap being mounted in a movable, in particular pivotable manner on a filler-neck housing or charging housing of the automobile. When the filler-neck flap or charging flap is in the opened position, a fuel tank of the automobile can be filled with fuel, or electrical drive components of the automobile can be electrically charged. Other applications both in the automotive field and also outside the automotive field are however also conceivable.

According to the invention, the first actuation part is fastened on the flap and is moved together with the flap when the flap is moved. The second actuation part is fastened on the component, which is normally arranged fixedly on or in the automobile, and correspondingly does not move during a movement of the flap. Here, during a movement of the flap, the first actuation part is moved at least in an axial direction. The first actuation part may additionally also be moved in other directions; for example, in the case of a pivoting movement of the flap, the first actuation part also performs a pivoting movement. The movement of said first actuation part however also has an axial component, such that the first actuation part can be placed in engagement in the axial direction with the second actuation part.

According to the invention, the first and the second actuation part are separate from one another. The actuation parts may be placed into a locking position by virtue of the flap being closed. This may be realized manually by virtue of the flap being pushed into the closed position. In the locking position, the flap fixedly connected to the first actuation part is also locked to the component. Here, the actuation device according to the invention provides a spring pretension, which seeks to release the first actuation part, from the position in which it is locked to the second actuation part, from the second actuation part again, such that the flap with the first actuation part is at least partially opened. According to the invention, however, the locking element holds the first actuation part in the locking position counter to said spring pretension by engaging into the locking reception. Here, the dimensions of the locking element and locking reception may be such that, in the locking position, substantially no axial movement between the first and the second actuation part is possible. In the locking position, the first actuation part thus cannot be released from the second actuation part. The flap connected to the first actuation part correspondingly cannot be opened manually, for example. For this purpose, it is necessary firstly for the locking position to be eliminated by virtue of the locking element being placed out of engagement with the locking reception by the drive means by means of the remote unlocking device according to the invention. With the remote unlocking device according to the invention, the drive means can be actuated from a place distant from a, in particular from the, component with the flap. After the release of the locking by the remote-actuated drive means, the spring preload of the actuation device now moves the first actuation part together with the flap away from the second actuation part, wherein the flap moves into an at least partially open position. Here, the spring preload for opening the flap acts directly, such that the flap automatically opens at least partially. In particular, for said at least partial opening of the flap, it is not necessary for the flap to be manually pushed in in the sense of a push-push function. The unlocking and partial opening of the flap rather takes place entirely by remote initiation. The partially opened flap can then subsequently be gripped by hand and opened fully. It is however also conceivable for the flap to move fully into its open position automatically, driven for example by a suitable spring force.

As already explained, the drive means are actuated remotely, such that for example a driver of the automobile equipped with the actuation device according to the invention can remotely unlock for example a filler-neck flap, and thus place the latter into an at least partially opened position, from the interior of the automobile. Such remote unlocking may also be initiated by means of a radio remote control for the automobile. Greater convenience is attained in this way.

In the locking position, an inadvertent opening of the flap, for example of a filler-neck flap, in a car wash or in the case of pivoted or overhead assembly of an automobile is reliably prevented. There is no need for a high spring force to be applied which holds the flap in the closed position, such as is necessary in the prior art. The convenience during the use of the flap is hereby increased. Furthermore, noises generated by such high spring forces during operation, which noises are perceived as unpleasant by a user, are avoided. For reasons of convenience, it may also be provided in the invention that the flap is pretensioned into the closed position by spring force. The corresponding spring force is however substantially freely selectable and may in particular be considerably lower than in the prior art. In a manner which is likewise known per se, the spring force may exhibit a reversal point, such that, as already explained, beyond a certain degree of opening, the flap is pretensioned into the fully open position.

Particularly secure locking is thus attained according to the invention. At the same time, a high degree of sealing against the ingress of moisture or dirt is attained in the closed position and in the opened position of the flap. Corresponding sealing lips may be provided for this purpose. Here, the actuation device according to the invention is characterized by robustness and a simple construction with a particularly low number of components. As a result of the small structural size of the actuation device according to the invention, usage in small filler-neck or charging housings of automobiles is also possible. As already mentioned, the device according to the invention for locking and unlocking requires only the locking element and locking reception including the spring pretension. According to the invention, it is in particular not necessary for a push-push kinematic to be provided for the locking and unlocking. This makes the device according to the invention particularly simple in terms of construction.

Furthermore, the actuation device according to the invention is of modular construction and can thus be oriented in a substantially flexible manner in accordance with the respective customer demands and adapted to existing systems. The major constituent parts of the actuation device, in particular the actuation parts, may be composed of a plastic. Here, the locking according to the invention may be combined with a central locking system of an automobile.

The spring preload may be provided by spring means which are pretensioned by the first actuation part during the course of the locking thereof to the second actuation part. The spring means may in particular comprise a spring which is compressed by the first actuation part during the locking of the first actuation part on the second actuation part. A particularly simple construction is attained in this way.

In a further embodiment, it may be provided that one of the actuation parts comprises a tappet, on the outer circumference of which the locking reception is provided and in that the other of the actuation parts comprises a housing in which the locking element is moveably mounted, wherein the tappet enters the housing through an entrance opening upon movement of the flap from its opened position into its closed position, whereby the locking element engages with the locking reception. A particularly robust and compact and simultaneously structurally simple construction is attained in this way. The tappet may have a cylindrical basic shape and, during the course of the locking of the actuation parts, protrudes in the axial direction into the housing. It may be provided either that the first actuation part comprises the tappet and the second actuation part comprises the housing with the locking element, or that the first actuation part comprises the housing and the locking element and the second actuation part comprises the tappet.

In a further embodiment, it may be provided that the actuation part comprising the housing further comprises a bolt mounted axially moveably in the housing, wherein the bolt is pretensioned by spring means in the direction of the entrance opening of the housing, wherein the tappet presses the bolt against the spring means during locking of the actuation parts and thereby pretensions the spring means. The spring means may, on that side of the housing which faces away from the tappet, be in direct contact with the bolt. The tappet thus, upon entering the housing, comes into contact with the bolt and pushes the latter further into the housing counter to the spring force of the spring means. In the unlocked state of the actuation parts, the locking element can bear against the outer side of the bolt.

For particularly simple locking, the locking reception may be a locking groove extending over the outer circumference of the tappet. The rotational orientation of the tappet is then not of significance for the locking. The tappet may be surrounded by a sealing on its circumference, in particular by a bellows. The sealing may be elastic. The sealing or the bellows may in particular completely surround the circumference of the tappet. Said sealing or bellows seals off the tappet with respect to dirt and moisture. The sealing thus automatically also leads to protection of the housing against dirt and moisture when the tappet enters the housing. On the free end of the tappet, the sealing or the bellows may bear sealingly against the tappet. The same applies to that end of the tappet which is situated opposite the free end. The tappet may be mounted on the sealing elastically in an axial direction. The sealing may for example receive a flange of the tappet. The elastic mounting may then be effected by means of the resiliently elastic configuration of the seal. A tolerance compensation is ensured in this way.

According to a further embodiment, it may be provided that the locking element is a locking bar moveable by the drive means in a radial direction with regard to the movement direction of the tappet between an unlocking position being retracted from the locking reception and a locking position being inserted into the locking reception. The locking bar may be pretensioned into its locking position by bar spring means. The locking bar may for example be of fork-shaped form and engage with its free end into the locking reception, for example a locking groove. The bar spring means may for example comprise a spring which acts on one end of the locking bar, which spring is compressed when the locking bar is moved out of the locking reception.

In a further embodiment, the tappet comprises a section tapered in the direction of its free end between the locking reception and its free end. By means of such a section which is tapered conically, for example, the locking element can, when the tappet enters the housing, be moved, for the locking of the actuation parts, back into the locking reception which is situated behind the tapered section as viewed from the free end. This is particularly important if the locking element is pretensioned into the locking position by spring means. Then, during the insertion of the tappet, said locking element then slides along the outer side of the tappet and in particular of the tapering section, until said locking element locks in the locking reception.

In a particularly practical embodiment, the drive means may comprise an electric motor. An axis of rotation of the electric motor may be arranged parallel to the movement direction of the first actuation part for locking to the second actuation part, in particular to an axial movement direction of a tappet. A particularly compact construction is attained in this way. In a further embodiment, it may be provided that the drive means comprise a worm wheel rotatably driven by the electric motor with a spiral shaped guiding groove, in which a guiding projection of the locking bar engages, wherein the guiding projection is guided through the spiral shaped guiding groove during rotation of the worm wheel effected by the electric motor such that the locking bar is moveable or moved into its unlocking position against the pretension provided by the bar spring means. The motor may for example engage, by means of a gearwheel with an external toothing, with a suitable internal toothing of the worm wheel. The worm wheel may for example have the spiral shaped guiding groove on its top side or its underside. The locking bar may then for example have, for example on its underside or on its top side, a guiding projection which engages with the guiding groove. If the worm wheel is rotated by the electric motor, the guiding projection is moved along the spiral shaped guiding groove toward the center of the worm wheel. In this way, in turn, the locking bar is moved in the radial direction away from the tappet with its locking reception, such that the locking bar passes out of engagement with the locking reception. Said movement of the locking bar takes place counter to the preload provided by the bar spring means.

It may then furthermore be provided that a radially outer beginning and a radially inner end of the guiding groove are connected with one another through a connecting section extending in radial direction. In said embodiment, the guiding projection of the locking bar, driven by the bar spring means, can move radially outward again from the radially inner end of the spiral shaped guiding groove through the connecting section running in the radial direction, such that, for renewed locking, the locking bar can engage into the locking reception again. In a simple manner, a rotation of the worm gear is not required for this purpose. The worm gear can be rotated in particular through approximately 360° between the locking position and the unlocking position of the locking bar.

The guiding groove of the worm wheel may furthermore comprise a stop on its radially inner end, against which the guiding projection of the locking bar abuts upon reaching the unlocking position. The stop constitutes a defined end point for the rotational movement of the worm wheel. The electric motor thus need not be operated to a defined end position, but rather can in a simple manner be driven until the stop is reached. Such motors operate at very high speed, such that precise control to an end point would be cumbersome.

Alternatively or in addition to the electric drive means explained above, the drive means may also comprise a manually operatable actuation cable. This may be necessary firstly for emergency unlocking for example when a battery of an automobile is discharged. Then, instead of the electric motor, the mechanical cable may act for example directly on the worm wheel and rotate the latter, by the exertion of a suitable tensile force, in order to move the locking bar into its unlocking position. The cable may comprise a wire or Bowden cable which engages for example eccentrically on the worm wheel. It is self-evidently also conceivable for such a mechanical cable to engage directly on the locking element, such that said locking element can be pulled directly out of the locking reception by the exertion of a suitable tension. It is also conceivable here for the mechanical cable to be the only remote unlocking device. The cable may then for example be manually actuable from the interior of an automobile.

The actuation device according to the invention may furthermore comprise at least one sensor device which detects a locking between the actuation parts. The sensor device may comprise a Hall sensor. By means of a sensor device of said type, it is possible to reliably detect whether the flap has been correctly locked. If a Hall sensor is used, it is possible for a suitable magnet to be arranged for example on a bolt which is axially moveably mounted in the housing and/or on the locking element, which magnet is detected by one or more Hall sensors for monitoring the locking position.

For particularly simple fastening, it may be provided that the first actuation part can be fastened on the flap by a locking connection or a bayonet connection and/or in that the second actuation part can be fastened on the component by a locking connection or a bayonet connection.

The invention also relates to a component with a flap mounted moveably on the component between a closed position and an opened position, in particular a housing of an automobile with a flap mounted moveably on the housing, comprising an actuation device according to the invention, wherein the first actuation part is fastened on the flap and the second actuation part is fastened on the component. The flap may in turn be a flap in or on an automobile or outside an automobile, for example a filler-neck flap or a charging flap.

BRIEF DESCRIPTION OF THE FIGURES

An exemplary embodiment of the invention will be explained in more detail below on the basis of figures, in which, in each case schematically.

DESCRIPTION OF SOME EXEMPLARY EMBODIMENTS

Figure 1:
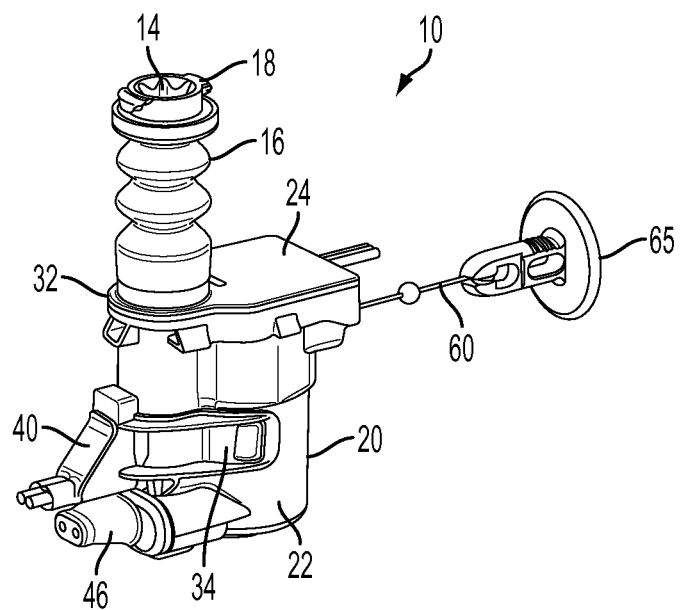
FIG. 1 shows an actuation device according to the invention in a perspective view.
Figure 2:
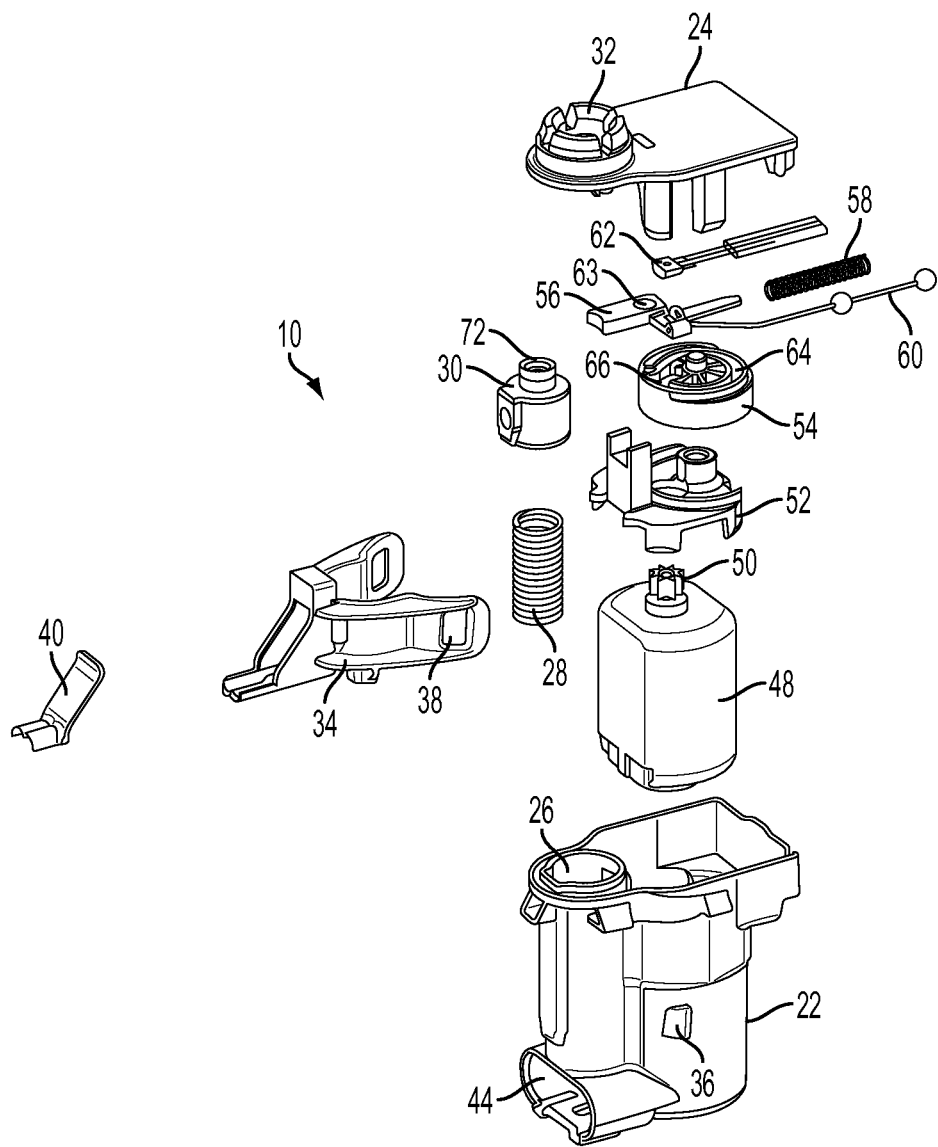
FIG. 2 shows a part of the actuation device from FIG. 1 in an exploded illustration.

Unless stated otherwise, the same reference numerals are used in the figures to denote identical items. FIG. 1 shows an actuation device 10 according to the invention for a flap, in the present case a filler-neck flap, mounted moveably on a component, in the present case a filler-neck housing of an automobile, between a closed position and an opened position. The component and the flap are not shown here. The actuation device 10 comprises a first actuation part with a tappet 12, of which only the head 14 is visible in FIG. 1. The tappet 12 is hidden by a sealing, in the present case an elastic bellows 16, which surrounds the circumference of the tappet 12. On the head 14 of the tappet 12 there are situated projections 18 by means of which the tappet 12 can be fastened to the flap in the manner of a bayonet connection. The actuation device 10 furthermore has a second actuation part with a housing 20. As can be seen in particular in FIG. 2, the housing 20 is composed substantially of a housing main body 22 and of a housing cover 24. The first actuation part of the actuation device 10 is not illustrated in FIG. 2. The main body 22 of the housing 20 has a substantially cylindrical reception opening 26 in which a spring 28 and a bolt 30 are received. The housing cover 24 has an entrance opening 32 for the tappet 12, wherein the underside of the entrance opening 32 forms a stop surface for the bolt 30, such that said bolt, in the cylindrical reception opening 26, is preloaded by the spring 28 against the housing cover 24 and can be moved in an axial direction counter to the spring pretension 28. A housing clamp 34 is fastened to the housing main body 22 in a snap-action manner by means of receptions 38 which engage into projections 36 on the housing main body 22. During operation, the clamp 38 is closed off by a cover 40.

An electrical supply 46 can be connected via a contacting opening 44 of the housing main body 22 (see FIG. 1). The electrical supply serves inter alia for the operation of an electric motor 48 which is received in the housing main body 22. The electric motor 48 has, on its top side, a toothed wheel 50 with an external toothing. Rotatably mounted on a bearing 52 is a worm wheel 54, wherein the worm wheel 54 has, on its underside, an internal toothing which, in the assembled state, meshes with the toothed wheel 50 of the electric motor 48. Also shown in FIG. 2, with the reference numeral 56, is a locking element in the form of a locking bar 56 which, in the installed state, is pretensioned into the reception opening 26 in a radial direction by means of a spring 58. To the locking bar 56 there is furthermore connected a wire cable 60 for manual emergency unlocking. Also provided is a Hall sensor 62 which detects the radial position of the locking bar 56. For this purpose, a magnet 63 is provided on the locking bar 56. As shown in FIG. 1, a manually actuable handle 65, for example, may be connected to the wire cable 60.

The function of the actuation device 10 according to the invention shall be explained on the basis of FIGS. 3a and 3b to 8a and 8b. Said figures show six different operating states of the actuation device 10 for a locking of the first and second actuation parts and/or an unlocking of the first and second actuation parts, wherein in each case the same operating state is shown in the identically numbered sub-figures a and b. In the sub-figures labeled a, for reasons of clarity, the first actuation part is not illustrated in each case. Likewise not illustrated is the housing cover 24. By contrast, in the sub-figures labeled b, the majority of the second actuation part is not illustrated. Instead, the tappet 12 of the first actuation part is shown, but without its sealing 16.

Figure 3A:
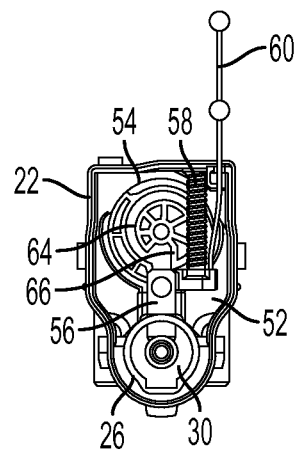
FIG. 3a shows an illustration of a part of the device from FIG. 1 in a plan view in a first operating position.
Figure 3B:
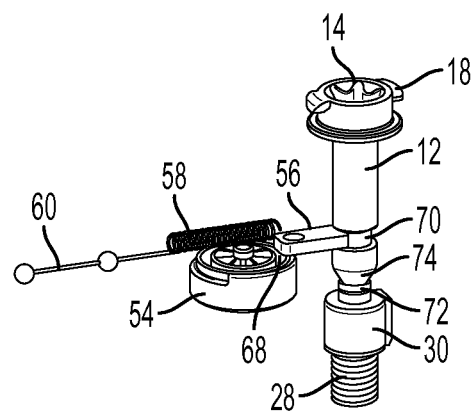
FIG. 3b shows another part of the device from FIG. 1 in a perspective view in the first operating position.

It can be seen in particular in FIGS. 3a to 8a that the worm wheel 54 has, on its top side, a guiding groove 64 which runs in a spiral-shaped manner and the radially inner end of which is formed by a stop surface 66. The locking bar 56 has, on its underside, a guiding projection 68 which can be seen in particular in FIGS. 3b to 8b and which engages into the guiding groove 64. FIGS. 3a and 3b show the closed state of the flap, in which the tappet 12 of the first actuation part is locked in the housing 20 of the second actuation part. In said state, the locking bar 56, driven by the spring 58, is situated in its locking position in which it projects with its free end radially into the cylindrical opening 26 and, as can be seen in particular in FIG. 3b, engages into a locking reception 70 which is provided on the outer circumference of the tappet 12 and which is in the form of an encircling locking groove 70. The tappet 12, and with the latter, the flap, thus cannot be released from the second actuation part. The flap is correspondingly locked in its closed position.

Figure 4A:
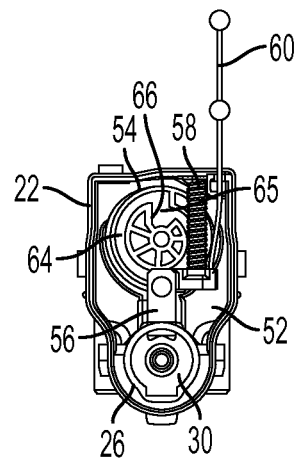
FIG. 4a shows an illustration of a part of the device from FIG. 1 in a plan view in a second operating position.
Figure 4B:
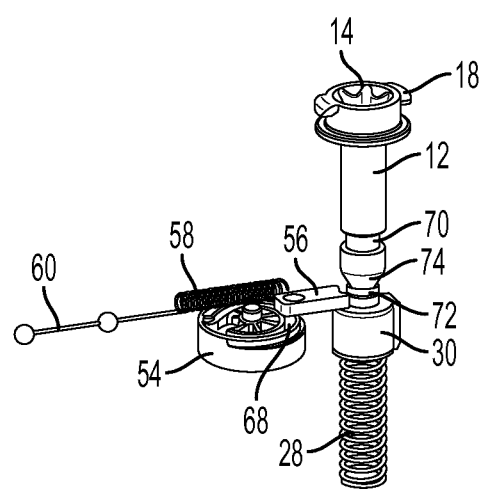
FIG. 4b shows another part of the device from FIG. 1 in a perspective view in the second operating position.
Figure 5A:
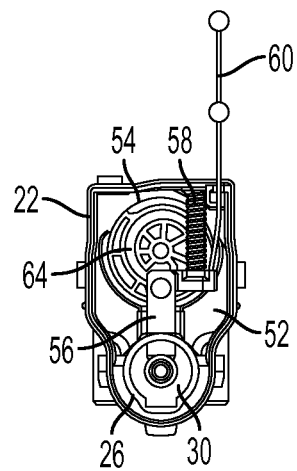
FIG. 5a shows an illustration of a part of the device from FIG. 1 in a plan view in a third operating position.
Figure 5B:
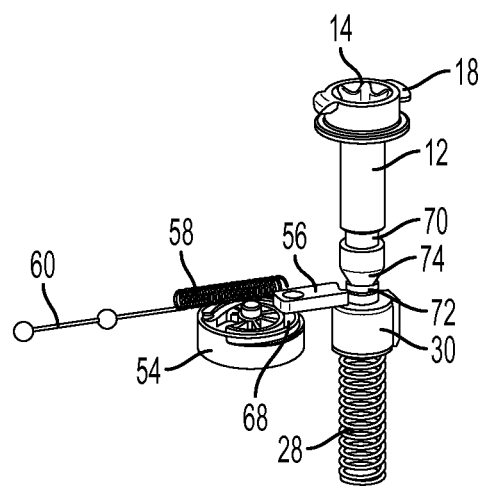
FIG. 5b shows another part of the device from FIG. 1 in a perspective view in the third operating position.
Figure 6A:
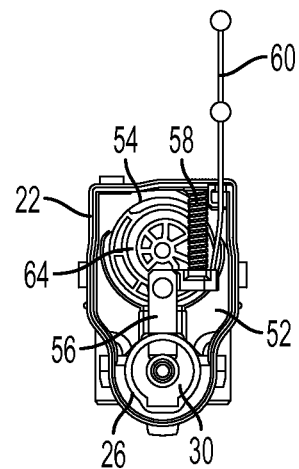
FIG. 6a shows an illustration of a part of the device from FIG. 1 in a plan view in a fourth operating position.
Figure 6B:
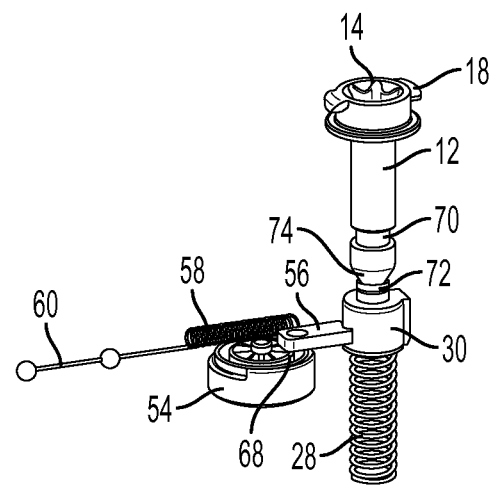
FIG. 6b shows another part of the device from FIG. 1 in a perspective view in the fourth operating position.
Figure 7A:
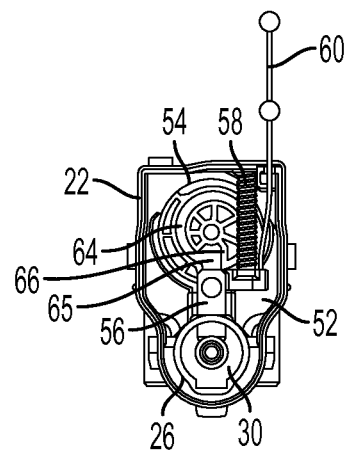
FIG. 7a shows an illustration of a part of the device from FIG. 1 in a plan view in a fifth operating position.
Figure 7B:
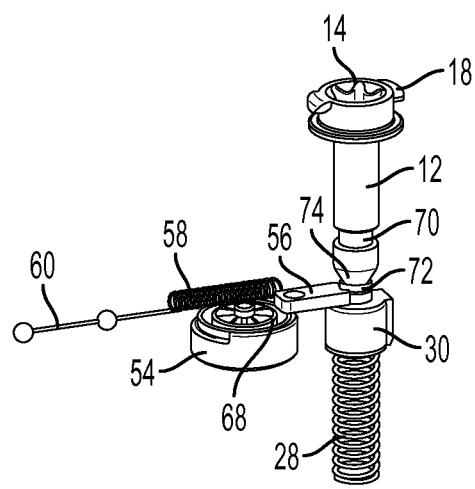
FIG. 7b shows another part of the device from FIG. 1 in a perspective view in the fifth operating position.

To release said locking, the worm wheel 54 is driven in rotation by the electric motor 48. Here, FIG. 4*a* shows an intermediate position in which the worm wheel 54 has been rotated 180° clockwise proceeding from the position shown in FIG. 3*a*. Here, owing to the spiral-shaped form of the guiding groove 64, the locking bar 56 is pulled in a radial direction out of the cylindrical reception opening 26 until the stop surface 66 is reached after a further rotation of the worm wheel through 180° clockwise, as shown in FIG. 5*a*. Here, it is possible in a simple manner for the drive motor 48 to be driven until said stop surface 66 is reached, without said drive motor having to be controlled to a defined end point. The movement, driven by the electric motor 48, of the locking bar 56 in the radially outward direction takes place counter to the pretension provided by the spring 58. When the locking bar 56 has been pulled out of the locking groove 70, the bolt 30, driven by the spring 28, pushes the tappet 12 upward, as can be seen in FIG. 4*b*. In FIG. 5*b*, the bolt 30 is situated in its position deployed to a maximum extent, in which it abuts with its top side against the underside of the housing cover 24. In the unlocking position, the locking bar 56 then bears against the outer surface of the bolt 30. The tappet 12 has moved upward by a defined distance in relation to its position in FIG. 3*b*, and with said tappet has moved the flap, which is now situated in an at least partially open position. The flap can now manually be pivoted open fully for example together with the tappet 12. It is however also conceivable for the flap 12, driven by a suitable spring force, to pivot into the fully open position automatically.

Figure 8A:
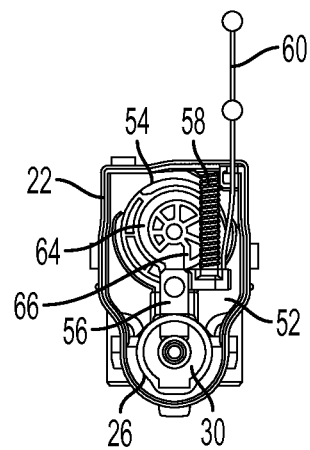
FIG. 8a shows an illustration of a part of the device from FIG. 1 in a plan view in a sixth operating position.
Figure 8B:
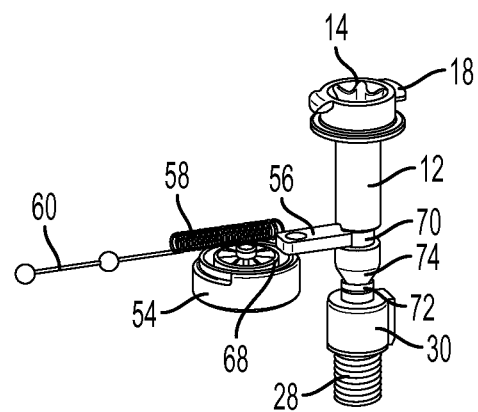
FIG. 8b shows another part of the device from FIG. 1 in a perspective view in the sixth operating position.

A subsequent locking of the tappet 12 of the first actuation part on the housing 20 of the second actuation part shall now be explained on the basis of FIGS. 6*a* to 8*a* and 6*b* to 8*b*. For locking, the tappet 12 is pushed downward, for example manually, out of the position shown in FIG. 6*b* against the bolt 30 and counter to the pretension provided by the spring 28. Here, when the locking bar 56 reaches the upper edge of the bolt 30, said locking bar is pushed radially inward, driven by the spring 58, until said locking bar reaches an upper contact surface 72 of the bolt 30, with which the free end of the tappet 12 is in contact. The worm wheel 54 need not be turned back for this purpose. Rather, the radially outer beginning and the radially inner end of the guiding groove 64 are connected with one another through a radial connection section 65. Owing to said connection between the beginning and the end of the guiding groove 64, it is possible for the locking bar 56 to be moved by means of its guiding projection 68 into the radially inner position shown in FIGS. 7*a* and 7*b*, without the worm wheel 54 having to be rotated. It can also be seen that the tappet 12 has a conical tapering 74 in the region of its free end. By means of said conical tapering 74 of the outer contour of the tappet 12, the locking bar 56 is, as the tappet 12 is pushed further in, guided initially radially outward again proceeding from the state shown in FIG. 7*b* until the tappet 12, driven by the spring 58, locks in the locking groove 70 again, as can be seen in FIG. 8*b*. In said state, actuation parts are locked to one another again such that the flap cannot move out of its closed position into the opened position.

Here, the actuation of the electric motor 48 is performed by means of remote actuation. In the example shown, an actuation switch is situated in the interior of the automobile fitted with the filler-neck flap. If said actuation switch is actuated by a user of the automobile, the electric drive motor 48 is, via a suitable control line laid through the automobile, activated so as to unlock the actuation device. Remote unlocking of the filler-neck flap is thus realized in a convenient manner. At the same time, the actuation device according to the invention is characterized by a particularly compact and simple construction, and in the locking position, provides a high level of security against inadvertent opening.

The invention claimed is:

1. An actuation device for moving a flap between a closed position and an at least partially opened position, the flap being mounted on a component, the actuation device comprising:
    a first actuation part configured to be coupled with the flap, the first actuation part having a locking reception;
    a second actuation part configured to be coupled with the component, the second actuation part comprising:
        a first spring configured to apply a first spring pretension against the first actuation part;
        a locking element configured to engage the locking reception such that the locking element is in a locking position when the flap is in the closed position, and to hold the first actuation part against the first spring pretension when the locking element is in the locking position;
        a second spring configured to apply a second spring pretension against the locking element to drive the locking element toward the first actuation part;
        a worm wheel having a spiral shaped guiding groove engaged with a portion of the locking element, the worm wheel being configured to rotate about an axis and cause the portion of the locking element to be guided through the spiral shaped guiding groove to counter the second spring pretension and cause the locking element to be moved out of the locking position; and
    a remote unlocking device coupled with the worm wheel, the remote unlocking device being configured to be actuated from a place distant from the first actuation part and the second actuation part to cause the worm wheel to rotate such that the locking element is moved out of the locking position,
    wherein moving the locking element out of the locking position frees the first actuation part such that the first actuation part is driven by the first spring pretension in a direction away from the second actuation part to cause the flap to be moved from the closed position to the at least partially opened position.

2. The actuation device according to claim 1, wherein the first spring is between the first actuation part and the second actuation part such that the first spring pretension is generated by compressing the first spring based on a movement of the first actuation part in a direction toward the second actuation part during a locking operation in which the locking element is caused to engage the locking reception so as to be in the locking position, and hold the first actuation part against the first spring pretension.

3. The actuation device according to claim 1, wherein the first actuation part comprises a tappet having an outer circumference, the locking reception is on the outer circumference of the tappet, the second actuation part comprises a housing, the locking element is moveably mounted to the housing, and the tappet is configured to move through a sidewall of the housing through an entrance opening based on a movement of the flap between the at least partially opened position and the closed position.

4. The actuation device according to claim 3, wherein the second actuation part further comprises a bolt inside the housing between the tappet and the first spring such that the bolt is subjected to the first spring pretension, and the first spring pretension is applied against the tappet by way of the bolt.

5. The actuation device according to claim 3, wherein the locking reception is a locking groove extending along the outer circumference of the tappet.

6. The actuation device according to claim 3, wherein the outer circumference of the tappet is surrounded by a sealing.

7. The actuation device according to claim 6, wherein the sealing comprises an elastic bellows.

8. The actuation device according to claim 3, wherein the locking element is a locking bar configured to move into and out of the locking position by moving in a radial direction with respect to a central axis of the tappet.

9. The actuation device according to claim 3, wherein the tappet comprises a first end configured to be coupled with the flap, a second end opposite to the first end on a second actuation part side of the tappet, the locking reception is between the first end and the second end of the tappet, and the tappet has a tapered section between the locking reception and the second end.

10. The actuation device according to claim 1, wherein the remote device comprises an electric motor.

11. The actuation device according to claim 10, wherein a rotational axis of the electric motor is parallel to a movement direction of the first actuation part with respect to the second actuation part.

12. The actuation device according to claim 1, wherein a radially outer beginning and a radially inner end of the spiral shaped guiding groove are connected with one another through a connecting section extending in a radial direction of the worm wheel.

13. The actuation device according to claim 12, wherein the spiral shaped guiding groove comprises a stop on the radially inner end against which the portion of the locking element engaged with the guiding groove is caused to abut such that the locking element is in an unlocking position.

14. The actuation device according to claim 1, wherein the remote device comprises a manually operatable actuation cable.

15. The actuation device according to claim 1, further comprising at least one sensor configured to detect a position of the locking element.

16. The actuation device according to claim 15, wherein the at least one sensor comprises a hall sensor.

17. The actuation device according to claim 1, wherein the first actuation part is configured to be coupled with the flap by a locking connection or a bayonet connection and/or the second actuation part is configured to be coupled with the component by a locking connection or a bayonet connection.

18. The actuation device according to claim 1, wherein the component comprises a housing of an automobile, the flap is moveably mounted on the housing of the automobile, the first actuation part is fastened to the flap, and the second actuation part is coupled to the housing of the automobile.

19. The actuation device according to claim 1, wherein the component comprises a housing of an automobile, and the actuation device is for the flap moveably mounted on the housing.

20. An apparatus, comprising:
a first actuation part having a locking reception;
a second actuation part, comprising:
  a first spring configured to apply a first spring pretension against the first actuation part;
  a locking element configured to engage the locking reception such that the locking element is in a locking position, and to hold the first actuation part against the first spring pretension when the locking element is in the locking position;
  a second spring configured to apply a second spring pretension against the locking element to drive the locking element toward the first actuation part;
  a worm wheel having a spiral shaped guiding groove engaged with a portion of the locking element, the worm wheel being configured to rotate about an axis to cause the portion of the locking element to move through the spiral shaped guiding groove so as to counter the second spring pretension, and thereby cause the locking element to be moved out of the locking position; and
a motor coupled with the worm wheel, the motor being configured to cause the worm wheel to rotate such that the locking element is moved out of the locking position,
wherein the first spring is configured to drive the first actuation part in a direction away from the second actuation part when the locking element is moved out of the locking position.

21. The apparatus according to claim 20, wherein the first actuation part is configured to be attached to a flap that has an open position and a closed position, and the first actuation part is configured to move with respect to the second actuation part such that a first end of the first actuation part has a maximum travel distance that extends from a first position, corresponding to the closed position of the flap, to a second position, corresponding to the open position of the flap.

22. The apparatus according to claim 20, wherein the motor is an electric motor configured to be remotely actuated.

23. The apparatus according to claim 20, wherein the locking reception is a groove extending along an outer surface of the first actuation part.

24. The apparatus according to claim 21, wherein the first spring is configured to cause the first end of the first actuation part to move from the first position to a third position between the first position and the second position such that the flap is in a partially open position between the closed position and the open position when the locking element is moved out of the locking position.

25. The apparatus according to claim 22, wherein the first actuation part is configured to be moveable from the third position to the second position such that the flap is moved from the partially open position to the open position by way of a force external to the first spring.

26. The apparatus according to claim 21, wherein the first spring is configured to cause the first end of the first actuation part to move from the first position to the second position such that the flap is moved toward the open position when the locking element is moved out of the locking position.

27. The apparatus according to claim 21, wherein the first actuation part comprises a shaft having an outer surface and a tapered section between the locking reception and a second end of the first actuation part opposite to the first end, and the second spring is configured to drive the locking element toward the outer surface of the shaft such that the locking element contacts the tapered surface when the first end of the first actuation part is moved to the first position from the second position or a third position between the first position and the second position.

28. The apparatus according to claim 27, wherein the first actuation part is configured to be pushed toward the second actuation part to cause the locking element to be driven into the locking position by the second spring.

29. An apparatus, comprising:
- a tappet having a first locking member;
- a housing through which the tappet is configured to move;
- a first spring between the tappet and the housing, the first spring being configured to apply a first spring pretension against the tappet in a direction away from the housing;
- a second locking member configured to mate with the first locking member in a locking position, and to hold the tappet against the first spring pretension when the second locking member is in the locking position;
- a second spring configured to apply a second spring pretension against the second locking member to drive the second locking member toward the tappet; and
- a worm wheel having a spiral shaped guiding groove engaged with a portion of the second locking member, the worm wheel being configured to rotate about an axis to cause the portion of the second locking member to move through the spiral shaped guiding groove so as to counter the second spring pretension, and thereby cause the second locking member to move out of the locking position, wherein the first spring is configured to drive the tappet in the direction away from the housing when the second locking member is out of the locking position.

30. The apparatus according to claim 29, wherein the tappet is configured to be attached to a flap that has an open position and a closed position, and the tappet is configured to move with respect to the housing such that a first end of the tappet has a maximum travel distance that extends from a first position, corresponding to the closed position of the flap, to a second position, corresponding to the open position of the flap.

* * * * *